Sept. 23, 1969  W. D. HAENTJENS  3,468,572
SHAFT COUPLING
Filed Aug. 7, 1967
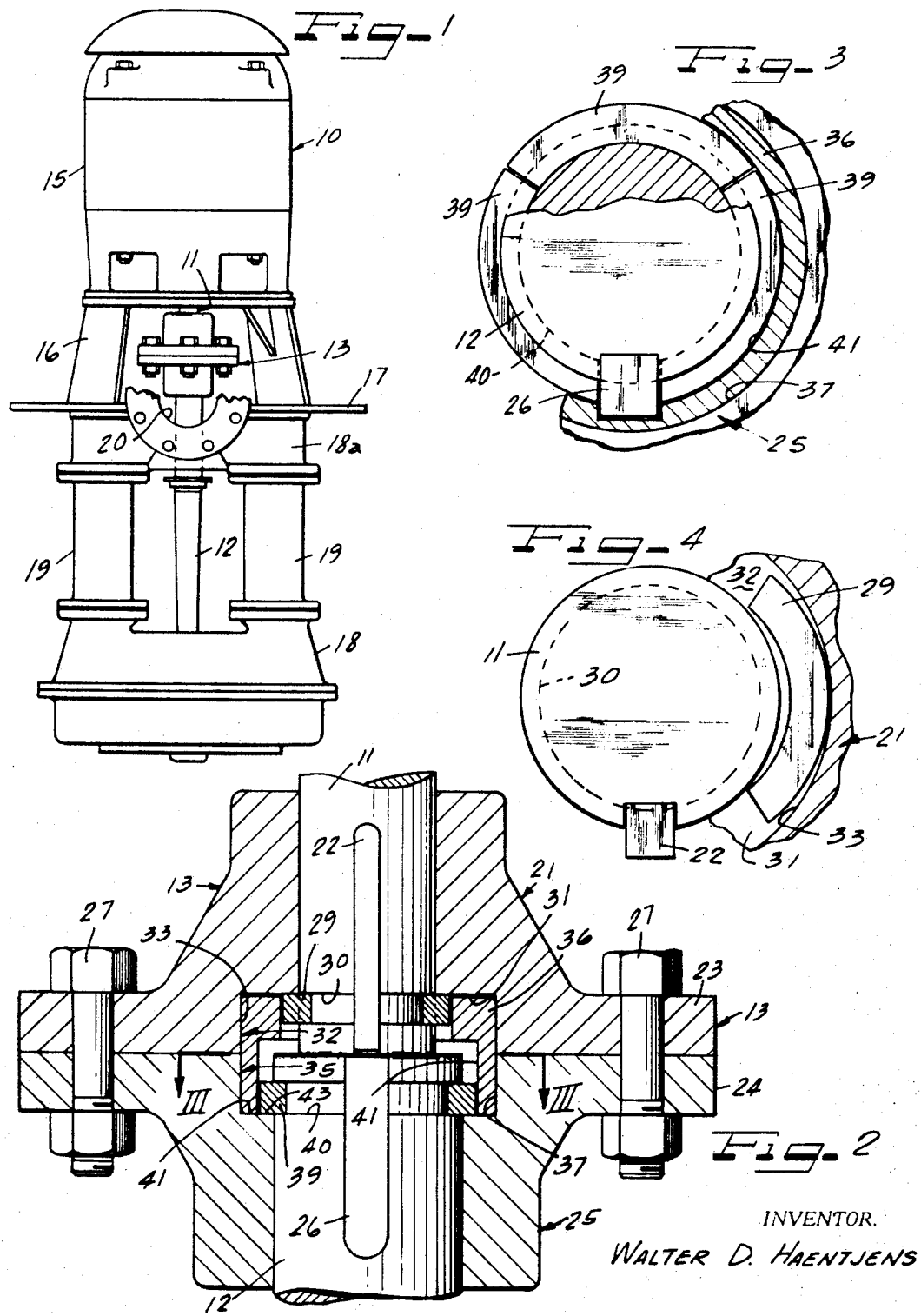
INVENTOR.
WALTER D. HAENTJENS
BY　ATTORNEYS

United States Patent Office 3,468,572
Patented Sept. 23, 1969

3,468,572
SHAFT COUPLING
Walter D. Haentjens, R.D. 1,
Sugarloaf, Pa. 18249
Filed Aug. 7, 1967, Ser. No. 658,720
Int. Cl. F16b 7/00; F16d 1/00; E21b 17/02
U.S. Cl. 278—129
6 Claims

ABSTRACT OF THE DISCLOSURE

Solid type of shaft coupling particularly adapted to couple a vertical motor shaft to an axially aligned pump drive shaft disposed beneath the motor shaft. This coupling includes flanged coupling parts shrunk fit and keyed to the adjacent ends of the shafts and bolted together to provide a solid drive connection. The coupling parts are retained from vibrating loose by split rings in the form of ring segments recessed in each shaft and projecting from the peripheries of the shafts to have locking engagement with the coupling parts. A retaining ring encompasses the split ring and has engagement with internal walls of the coupling parts, to retain the split rings in position, but to accommodate ready removal of the rings, where it may be desired to disconnect the shafts and remove the coupling parts as by the use of a hydraulic puller.

BACKGROUND OF THE INVENTION

Vertical pumps and particularly those used on barges in open pit mining operations, are designed with a view towards keeping the center of the gravity of the pump low. In order to attain this, the motor bearings form bearing supports both for the motor shaft and an aligned pump shaft. The motor shaft drives the pump shaft through a solid coupling, in which the coupling parts are keyed and shrunk fit to the shafts and bolted together. While the solid coupling is normally a suitable connector and support for the pump shaft and impeller driven thereby, the conditions of service of the pump are very severe and many times the shafts are subject to excessive vibrations, which loosens the motor shaft coupling. This allows the pump shaft to drop and results in binding of the impeller in the pump casing, as well as damage to the impeller and casing.

SUMMARY OF THE INVENTION AND OBJECTS

The present invention remedies the foregoing difficulties by recessing locking ring segments in grooves in the pump and motor shafts for locking the coupling parts to the shafts, and by retaining the ring segments to the shafts by a retainer ring recessed in the two coupling parts and holding the ring segments from coming out of their grooves.

A principal object of the present invention is to provide a simple form of locking means for locking coupling parts for the adjacent ends of a pair of aligned driving and driven shafts to provide a solid coupling between the shafts, and enable ready removal of the coupling parts from the shafts when required.

Another object of the invention is to provide a simple and improved form of solid coupling for a pair of axially aligned vertical driving and driven shafts, in which the driven shaft is locked from dropping from the driving shaft by severe vibrating conditions by a series of split metal rings recessed in the adjacent ends of the driving and driven shafts, in which a single retainer recessed in the coupling parts of the coupling retains the split rings in position.

Still another object of the invention is to provide a solid coupling forming a support and drive connection for the lower end of a vertical motor shaft to an aligned pump shaft, and supporting the pump shaft and its impeller for rotation in the pump housing, in which a pair of adjacent coupling parts is keyed and shrunk fit to the adjacent ends of the shafts, and in which a positive locking means is provided to prevent the dropping of one coupling part from its shaft, in the form of a series of metal ring segments recessed in the adjacent ends of the shafts and retained thereto by a retainer ring, seated in the two coupling parts.

These and other objects of the invention will appear from time to time as the following specification proceeds and with reference to the accompanying drawings.

DESCRIPTION OF THE DRAWINGS

FIGURE 1 is a view in side elevation of a pump in which a vertical motor shaft is connected to a depending pump shaft, in accordance with the principles of the present invention;

FIGURE 2 is an enlarged vertical sectional view taken through a form of coupling constructed in accordance with the principles of the present invention, showing the pump and motor shaft in elevation;

FIGURE 3 is a fragmentary sectional view taken substantially along line III—III of FIGURE 2, with certain parts of the lower shaft, the retainer ring and coupling parts broken away; and FIGURE 4 is a view similar to FIGURE 3, illustrating the method of assembling the segmental locking rings to one of the shafts, and showing the clearance between the internal wall of the coupling housing and the shaft to accommodate the insertion of the ring segments in position in the shafts.

DESCRIPTION OF THE PREFERRED FORM OF INVENTION

In FIGURE 1 of the drawings, I have shown a pump 10 of a type particularly adapted for use in open pit mining and having a vertical motor shaft 11 driving a coaxial depending pump shaft 12 through a coupling 13. The motor shaft 11 extends downwardly of a vertical motor 15 and is journalled in the motor housing on conventional bearings (not shown) which also form a support for the pump shaft 12 through the coupling 13 and in effect provide a cantilever support for said pump shaft. As shown in FIGURE 1, the motor 15 is mounted on the top of an open generally annular frame 16 having a downwardly spaced bottom plate 17 adapted to be mounted on a barge or foundation and forming a support for the motor 15 and a pump casing 18. The pump casing 18 is suspended from the plate 17 by discharge pipes 19 connected at their upper ends with a manifold 18a depending from the plate 17, and having an outlet 20 for the pump. The pump shaft 12 has an impeller (not shown), impelling fluid to be discharged under pressure through the pipes 19 and outlet 20 in a conventional manner and is no part of the present invention, so need not herein be shown or described further.

The coupling 13, as shown in FIGURE 2, comprises an upper coupling part 21, which may be shrunk fit to the motor shaft 11 and keyed thereto as by key 22. The coupling part 21 flares outwardly as it extends downwardly along the motor shaft 11 and terminates into a radial flange 23 abutting a radial flange 24 of a lower coupling part 25. The lower coupling part 25 is a form similar to the upper coupling part 21 and is shrunk fit to the upper end of the pump shaft 12 and keyed thereto as by a key 26. A series of circumferentially spaced nuts and bolts 27 is provided to secure the coupling parts 21 and 25 in tight abutting engagement with each other.

The locking means for locking the coupling part 21 to the shaft 11 and preventing said coupling part and the shaft 12 from dropping from the shaft 11 comprises a split locking ring in the form of a series of abutting ring segments 29 mounted in an annular groove 30, formed in the shaft 11. The ring segments 29 are abutted by an annular wall 31 of a downwardly opening annular recess 32, formed in an upper coupling part 21. The recess 32 opens towards a similar aligned annular recess 35 formed in the lower coupling part 25. The ring segments 29 abut opposite sides of the key 22 and are in substantial abutting engagement with each other. While I have herein shown a key 22 as keying the coupling part 21 to the shaft 11, a key need not necessarily be used and where the key is dispensed with, the ring segments extend along the groove 30 for the entire circumference thereof.

It may be seen from FIGURE 4, which is a view looking at the bottom of the motor shaft 11, that the cylindrical recess or chamber 32 opening toward the bottom of the coupling part 21 has a cylindrical wall 33 spaced from the periphery of the shaft 11 a distance sufficient to accommodate the ring segments to be placed in the recess, to one side of the shaft 11, and to then be moved into the annular groove 30. When the ring segments are in position of the groove 30, an annular retainer 36 may be placed in the recess 32 along the cylindrical wall 33 thereof, to retain the ring segments 29 in position in the groove 30.

The retainer 36 also fits within the upperly opening chamber or recess 35, along a cylindrical wall 37 thereof, to retain a series of ring segments 39 to an outwardly opening groove 40 formed in the shaft 12. The ring segments 39 are similar to the ring segments 29 and are retained in position by an outwardly stepped internal cylindrical wall 41 of the annular retainer 36. The ring segments 39 abut a bottom face 43 of the upwardly opening recess 35 in the coupling part 25 and thus retain the shaft 12 to said coupling part and prevent said shaft from vibrating loose from its coupling part and thereby preventing the shaft and impeller from dropping and jamming in the pump casing.

In assembling the coupling, the ring segments 29 are usually assembled in the groove 30 in the shaft 11. The ring segments 39 may then be fitted in the groove 40. The annular retainer 36 may then be placed in the upwardly opening recess 35 along a wall 37 thereof to retain the ring segments 39 to the groove 40. The coupling parts may then be drawn together, with the retainer 36 moving upwardly along the cylindrical wall 33 of the downwardly opening recess in the upper coupling part 21. The bolts 27 being in the bolt holes in the flanges 23 and 24, the nuts on said bolts then may be taken up, to engage the top face of the lower coupling part 25 with the bottom face of the upper coupling part 21, and hold said coupling parts in rigid connected relation with respect to each other.

It should here be understood that while the interior wall of the annular retainer 36 is stepped, that in this particular case the wall has been stepped to accommodate the retainer to retain the ring segments to two shafts of different diameters. Where the shafts are of the same diameter, the retainer may have an internal cylindrical wall of the same diameter for the height thereof.

It may be seen from the foregoing that a simple and improved solid coupling has been provided for coupling two aligned vertical shaft parts in abutting relation with respect to each other, and that the top coupling part is held from dropping from the shaft 11 by the ring segments 29 recessed in the groove 30 and abutted by the wall 32 of the coupling part, while the shaft 12 is held from vibrating loose from its coupling part 25 by the ring segment 39 in the recess 40 and abutting the bottom wall 41 of the upwardly opening recess in the lower coupling part 25. The shafts are thus rigidly connected together and the top coupling part is positively locked to the top shaft and the bottom shaft is positively locked to its coupling part in a simple and effective manner by the retainer ring 36, retaining the ring segments to their shaft grooves.

When it is desired to remove one coupling part from the other, it is merely necessary to loosen the nuts from the bolts 25 and separate the coupling parts. The coupling part may then be removed by moving the ring segments from the shaft grooves and pressing the coupling parts from the shaft by a conventional hydraulic puller.

While I have herein shown and described one form in which my invention may be embodied, it should be understood that various variations and modifications in the invention may be attained without departing from the spirit and scope of the novel concepts thereof.

I claim as my invention:

1. A solid coupling particularly adapted to couple a motor shaft to an axially aligned pump shaft comprising:
   a flanged motor shaft coupling part shrink fitted on the end of the motor shaft;
   a flanged pump shaft coupling part shrink fitted on the end of a coaxial pump shaft and adapted to abut said motor shaft coupling part;
   means securing said coupling parts in abutting engagement with each other;
   a circumferential groove extending about the motor shaft;
   said motor shaft coupling part having an axially opening annular recess therein, having a cylindrical wall spaced from the periphery of said shaft and said annular recess opening at one end to the pump shaft coupling part when said parts are in coupled relation with respect to each other and having an inner end wall;
   a series of ring segments mounted in said circumferential groove through said axially opening annular recess; and
   an annular retainer in said motor shaft coupling part and engaging the outer peripheries of said ring segments and said cylindrical wall of said axially opening annular recess, to retain said ring segments to said circumferential groove, said annular retainer having at one end an end wall engageable with said inner end wall of said annular recess and having an axial length sufficient so as to be engaged at its other end with an abutment shoulder on the abutting coupling part, to thus retain said ring segments in position upon the fastening of said coupling parts together.

2. A solid coupling according to claim 1, wherein each shaft has an outwardly opening annular groove extending thereabout,
   wherein each coupling part has an axially opening annular recess therein having a cylindrical wall spaced radially of the periphery of the associated shaft, and
   wherein a single annular retainer mounted in said annular recesses of said coupling parts extends about said ring segments and retains said ring segments to said grooves upon the fastening of said coupling parts together.

3. A solid coupling according to claim 2, wherein separate keys are provided to key said motor shaft coupling part and said pump shaft coupling part to said respective motor and pump shafts,
   wherein said keys extend across said grooves, and said ring segments abut opposite sides of said keys and are retained to said grooves and into abutting engagement with said keys by said annular retainer contained within said annular recessed portions of said coupling parts.

4. A solid coupling in accordance with claim 2, wherein the two shafts are of different diameters,
   wherein the cylindrical walls of the annular recesses of the motor shaft, coupling part and the pump shaft coupling part are of the same diameter, and
   wherein the annular retainer has an exterior wall portion engageable with the interior walls of the annular recesses in the two coupling parts, and has a stepped interior wall portion retaining the split rings to said shafts of different diameter.

5. A solid coupling particularly adapted for a vertical motor shaft and an axially aligned pump shaft comprising:

a flanged motor shaft coupling part shrink fitted on the end of the vertical motor shaft;

an abutting pump shaft coupling part shrink fitted on the end of a coaxial aligned vertical pump shaft;

means securing said motor shaft and pump shaft coupling parts in abutting engagement with each other;

the upper and lower coupling parts each having an axially opening annular recess therein having a cylindrical wall spaced radially from the peripheries of said shafts and having an inner wall perpendicular to said cylindrical wall, each shaft having an outwardly opening groove therein opening to said cylindrical walls of said coupling parts;

a series of ring segments mounted in each of said grooves and abutting the inner walls of said annular recesses of said coupling parts; and a single retainer engageable with the interior walls of said annular recesses and with the outer peripheries of said ring segments and held from axial movement by said coupling parts when secured in abutting engagement with each other for retaining said ring segments to said shafts and locking the upper and lower coupling parts to their associated shafts.

6. A solid coupling in accordance with claim 5, wherein the two shafts are of different diameters, wherein the cylindrical walls of the annular recesses of the motor shaft coupling part and the pump shaft coupling part are of the same diameter, and wherein the annular retainer has an exterior wall portion engageable with the interior walls of the annular recesses in the two coupling parts, and has a stepped interior wall portion retaining the split rings to said shafts of different diameter.

References Cited

UNITED STATES PATENTS

| | | | |
|---|---|---|---|
| 861,143 | 7/1907 | Scott. | |
| 1,318,455 | 10/1919 | Macdonald | 287—129 |
| 1,743,514 | 1/1930 | Alley et al. | |
| 2,953,403 | 9/1960 | Garey | 287—130 |
| 2,955,853 | 10/1960 | Bendicsen | 287—53 |

CARL W. TOMLIN, Primary Examiner

A. V. KUNDRAT, Assistant Examiner

U.S. Cl. X.R.

285—381, 415